US009316565B2

United States Patent
Kappaganthu et al.

(10) Patent No.: US 9,316,565 B2
(45) Date of Patent: Apr. 19, 2016

(54) EXHAUST MANIFOLD PRESSURE BASED MISFIRE DETECTION FOR INTERNAL COMBUSTION ENGINES

(71) Applicant: Cummins Inc., Columbus, IN (US)

(72) Inventors: Karthik Kappaganthu, Bloomington, IN (US); David Stroh, Columbus, IN (US)

(73) Assignee: Cummins Inc., Columbus, IN (US)

( * ) Notice: Subject to any disclaimer, the term of this patent is extended or adjusted under 35 U.S.C. 154(b) by 562 days.

(21) Appl. No.: 13/741,112

(22) Filed: Jan. 14, 2013

(65) Prior Publication Data

US 2014/0200852 A1 Jul. 17, 2014

(51) Int. Cl.
*G01M 15/11* (2006.01)
*G06F 17/10* (2006.01)

(52) U.S. Cl.
CPC .............. *G01M 15/11* (2013.01); *G06F 17/10* (2013.01)

(58) Field of Classification Search
CPC . G01M 15/11; G01M 15/106; G01M 15/102; G01M 15/10; G01M 15/08; G01M 15/04–15/06; G06F 17/10
See application file for complete search history.

(56) References Cited

U.S. PATENT DOCUMENTS

| | | | |
|---|---|---|---|
| 3,924,457 A | 12/1975 | Oshima et al. | |
| 3,965,677 A | 6/1976 | Goto et al. | |
| 3,983,754 A | 10/1976 | Deguchi et al. | |
| 4,567,755 A | 2/1986 | Ootsuka et al. | |
| 5,193,513 A | 3/1993 | Marko et al. | |
| 5,287,283 A | 2/1994 | Musa | |
| 5,392,642 A | 2/1995 | Tao | |
| 5,559,285 A * | 9/1996 | Bryant et al. | 73/114.02 |
| 6,243,641 B1 | 6/2001 | Andrews et al. | |

FOREIGN PATENT DOCUMENTS

WO WO-99/44028 9/1999

OTHER PUBLICATIONS

International Search Report and Written Opinion for International Application No. PCT/US2014/011294, dated Jul. 29, 2014, 11 pages.

* cited by examiner

*Primary Examiner* — Toan Le
(74) *Attorney, Agent, or Firm* — Foley & Lardner LLP

(57) ABSTRACT

An engine cylinder misfire detection system is provided that detects changes in exhaust manifold pressure (EMP) fluctuations, compares the EMP fluctuations with diagnostic thresholds determined with other engine characteristic information obtained from engine sensor data, and determines whether a cylinder misfire has occurred. A method of monitoring and detecting EMP fluctuations in combination with one or more sensed engine characteristics is disclosed to determine an engine cylinder misfire in a cycle of an internal combustion engine having at least one cylinder. The actuation approaches of the present invention include one or more processes for a cylinder of an engine associated with a determination of various load variables including fresh air flow, engine type, engine data inputs, and analytical determinants.

47 Claims, 11 Drawing Sheets

600

EXHAUST MANIFOLD PRESSURE BASED MISFIRE DETECTION FOR INTERNAL COMBUSTION ENGINES

FIELD OF INVENTION

This invention is generally directed to the field of internal combustion engines and more particularly to a system and method for detecting engine cylinder misfires in a range of operating conditions in such internal combustion engines.

BACKGROUND OF THE INVENTION

Engine manufacturers have developed techniques for constantly monitoring the operational characteristics of the engine to determine when engine operation is abnormal or outside of prescribed tolerances. Engine manufactures have sought approaches and methods to determine or predict when abnormal operations may occur in an attempt to meet the demand for increased internal combustion engine efficiency and improved emissions control. Similarly, having approaches that may identify early anomalies in operations may assist in preventing damage and avoiding potentially costly repairs to an internal combustion engine Engine cylinder misfire (i.e., misfire) is an example of one such event. Engine manufacturers seek to detect the occurrence of a misfire, for when detected, a misfire may be an early indication of a potential problem with the operation of the engine. For instance, a cylinder misfire can occur due to failed ignition of the fuel-air mixture within an engine cylinder (lack of combustion) or the incomplete ignition of the fuel-air mixture caused by too lean of a mixture (incomplete combustion). In operation, where such a misfire occurs, the affected engine performance is diminished, emissions are likely increased, and fuel economy is reduced. Similarly, if left uncorrected, a misfire may also result in damage to the engine and its components, including damage to the catalytic converter, for instance.

Further, engine cylinder misfire detection is a requirement for On-Board Diagnostics II (OBD II). OBD II is a second generation of on-board self-diagnostic equipment requirements which provide for the ability to monitor engine components that can affect emission performance, such as misfires in engines. Typically, an OBD II system will also store important information about a detected malfunction, such as engine cylinder misfire and the faulted cylinder or component.

Engine manufacturers have used a variety of approaches to detect engine misfires, but none of the prior art methods take into account a multitude of present operating conditions of an internal combustion engine including exhaust manifold pressure (EMP) with information from other sensor data such as engine speed, charge flow (or mass air flow (MAF)), Exhaust gas Recirculation (EGR) pressure, ambient pressure, turbine speed and turbine position, to detect an engine misfire.

For example, U.S. Pat. No. 5,193,513 to Marko et al. discloses a misfire detection system for use in an internal combustion engine in which an exhaust pressure sensor, a position sensor for sensing the rotational position of the engine, and an analog-to-digital converter for digitizing an analog signal received from the pressure sensor are employed. The digitized pressure data is compared using a data classifier (i.e. pattern recognition system) that is trained to recognize data signatures of individually misfiring cylinders. To train the classifier, the engine is operated in a service bay and engine data is collected during both intentionally induced misfires and under normal conditions. This data is then presented to the data classifier in a training operation. Engine misfire detection systems such as the one disclosed in Marko, et al., however, fail to compare a multitude of engine operation characteristics to sensed engine cylinder peak pressures as a way of detecting partial or complete engine misfires.

U.S. Pat. No. 3,965,677 to Goto et al. discloses a misfire detecting apparatus in which the suction pressure of an engine is detected and used to calculate a threshold level wherein a cylinder misfire is declared if the exhaust gas pressure exceeds this threshold level.

U.S. Pat. No. 3,983,754 to Deguchi et al. discloses an apparatus for detecting misfires in a multi-cylinder internal combustion engine in which pressure responsive devices are provided in the branches of the exhaust manifold or exhaust ports and the outputs of these devices are compared to detect an engine cylinder misfire.

U.S. Pat. No. 4,567,755 to Ootsuka et al. discloses an ignition/misfire detector for an internal combustion engine in which a pressure detection unit is used to detect changes in combustion pressure in the engine and an ignition/misfire detection unit is used to determine the occurrence of an engine ignition misfire.

U.S. Pat. No. 3,924,457 to Oshima et al. discloses a misfire detecting device for an internal combustion engine in which an exhaust gas introducing tube is provided adjacent to an exhaust port in an exhaust passage to provide exhaust gas to a pressure transducer disposed at one end of the exhaust gas introducing tube to determine pressure fluctuation which may indicate a possible engine cylinder misfire.

In OBD II systems, many current monitors use crank speed fluctuations in order to detect misfires. However, it is generally recognized that using crank speed fluctuations are dependent upon power train and vehicle dynamics. Such dependency, including that using engine speed, is limiting however as the portability of detection across various applications is unavailable and the inputted data is often negatively influenced by driveline dynamics.

These prior methods of detecting engine cylinder misfire are devoid of the unique approach to employ a multitude of present engine operating conditions, including that of utilizing a relationship between in-cylinder pressure, changes in EMP fluctuations and other operating conditions to provide an efficient engine cylinder misfire detection system.

A novel engine cylinder misfire detection system and improvement over the prior art is disclosed in U.S. Pat. No. 5,392,642 to Tau, a patent which is assigned to Cummins Engine Company, Inc., the same assignee of the present invention. This patent discloses an engine cylinder misfire system that uses a sensor to monitor an engine cylinder for all engine cycles and to provide an average of the detected output for each cylinder. Furthermore, the engine speed and fuel rate of the internal combustion engine are used to provide a more effective engine cylinder misfire detection system. Nevertheless, the invention disclosed in the Tau patent is directed to a system for detecting low power in at least one cylinder of a multi-cylinder engine. Furthermore, this application discloses the use of multiple pressure sensors, specifically one sensor for each cylinder to provide engine misfire detection.

A further novel engine cylinder misfire detection system and improvement over the prior art is disclosed in U.S. Pat. No. 6,243,641 to Andrews et al., incorporated herein by reference, which is a patent assigned to Cummins Engine Company, Inc., the same assignee of the present invention. This patent discloses an engine cylinder misfire detector system which calculates and compares a minimum pressure value, using a pressure sensing means for sensing the peak pressure of the exhaust gas flowing through the exhaust and operating characteristics of the internal combustion engine, to determine if an engine cylinder misfire has occurred.

Other approaches have also been set forth, but these methods also are devoid of detecting engine cylinder misfire utilizing a relationship between in-cylinder pressure, changes in EMP fluctuations and other operating conditions to provide an efficient engine cylinder misfire detection system that it operable over a variety of operating environments (i.e., power trains, vehicles, etc.), may be calibrated across different applications, and is reliable over a variety of operating conditions.

Therefore, the inventor has recognized a need for an engine cylinder misfire detection system that detects changes in EMP fluctuations, compares the EMP fluctuations with diagnostic thresholds determined with other information obtained from other engine sensor data, and determines whether a cylinder misfire has occurred. Further, the inventor has recognized a need for developing a method of monitoring and detecting EMP fluctuations to determine the occurrence of a misfire.

SUMMARY OF THE INVENTION

It is an object of the present invention to provide an improved system and method for determining when an engine cylinder misfire occurs in an internal combustion engine.

It is an object of the present invention to provide a method of monitoring and detecting EMP fluctuations in combination with one or more sensed engine characteristics to determine the occurrence of a misfire.

It is a still further object of the present invention to provide a system and method for accurately and reliably detecting an engine cylinder misfire by analyzing changes to EMP fluctuations with in-cylinder pressure and other operating conditions of the engine to determine when an engine cylinder misfires occurs.

It is a further object of the invention to provide for one or more processes to detect a misfire condition of the cylinder of an engine as either being present or not present in relation to determined fresh air flow (FAF), engine type, engine data inputs, and analytical determinants using the present invention, where the one or more processes include an estimated exhaust manifold pressure estimation process (EEMPP) or a centroid projection process (CPP).

As used herein, FAF is intended to further include but not be limited by engine characteristics and information (hereinafter "engine characteristics," "information," and similar) regarding engine load, such as fuel quantity, mass charge flow (MCF), fresh air flow, etc. and may be depicted as FAF, FAF/MCF, or similar, interchangeably. More particularly, for non-stoic engine applications, fuel quantity may be used as a direct substitute for FAF. Similarly, for estimated Fresh Air Flow (EFAF), EFAF is intended to further include but not be limited by engine characteristics and information regarding estimated engine load, such as estimated fuel quantity, estimated mass charge flow (EMCF), estimated fresh air flow, related thresholds, etc. and may be depicted or used as estimated load threshold, EFAF, EFAF/EMCF, or similar, interchangeably.

As used herein, a sensed engine characteristic may include but not be limited to any of engine characteristics, information or similar measured by a sensor or otherwise sensed during operation of the engine, including but not limited to: EMP, FAF, engine speed, MAF, fueling Exhaust Gas Recirculation (EGR) pressure, ambient pressure, turbine speed, turbine position, and similar.

The present invention fulfills these needs and has been developed in response to the present state of the art, and in particular, in response to the problems and needs in the art that have not yet been fully solved by currently available technologies. The present invention provides a method, system and computer program product for determining a misfire condition of an engine cylinder over known approaches.

In one embodiment, the present invention provides for a method for detecting an engine cylinder misfire in an internal combustion engine by comparing a first load variable (FLV) with a first estimated load variable (FELV) for a first cylinder of the engine and initiating a first process. The embodiment preferably further measures an exhaust manifold pressure (EMP), using the first process, calculates an operating value (OV) in relation to one or more data inputs of engine characteristics and a comparative value (CV) associated with a threshold value. Further, the OV and the CV are compared and a misfire condition is detected for the first cylinder. Preferably, the first process in an embodiment is one of an estimated exhaust manifold pressure process (EEMPP) or a centroid projection process (CPP), for which if the FLV is less than the FELV, the process initiated is the EEMPP. Additionally, it is preferred that the one or more data inputs include at least one of: EMP, engine speed, mass air flow (MAF), EGR pressure, ambient pressure, turbine speed and turbine position. For the avoidance of doubt, the term FLV is intended to be inclusive of the descriptor FAF/MCF and the term FELV is intended to be inclusive of the term EFAF/EMCF. Further, in one or more preferred embodiments, the FLV is one or more of an engine characteristic, engine load, fuel quantity, mass charge flow (MCF), fresh air flow (FAF), flow rate, and the FELV is one or more of an estimated engine characteristic, estimated engine load, estimated fuel quantity, estimated mass charge flow (EMCF), estimated fresh air flow (EFAF), estimated flow rate, associated with the FLV.

In a further embodiment, the present invention provides for a method for detecting an engine cylinder misfire in an internal combustion engine by comparing a FAF with an EFAF for a first cylinder of the engine and initiating a first process.

In another embodiment the present invention provides for a system for identifying a misfire condition of an engine cylinder in an internal combustion engine. The system comprises: at least one load estimate providing a first load variable (FLV); at least one pressure sensor operatively coupled to detect an exhaust manifold pressure (EMP); at least one data sensor operatively coupled to detect at least one or more data inputs of engine characteristics of the engine; and a control system for the engine having an exhaust gas output. The embodiment further includes the control system having a plurality of actuation controllers being in communication with the at least one load estimate, the at least one pressure sensor, and the at least one data sensor, through one or more actuation controllers; a data processor in communication to receive data sensed by the at least one load estimate, the at least one pressure sensor, and the at least one data sensor. Preferably the processor utilizes a first process to calculate an operating value (OV), the first process being determined in relation to comparing the received data sensed and estimated associated data, and a comparative value (CV), associated with a threshold value; comparing the OV and the CV, and, detecting a misfire condition for the cylinder.

In the preferred embodiment the present invention further provides for first process being one of an estimated exhaust manifold pressure process (EEMPP) or a centroid projection process (CPP).

In a further embodiment, the present invention provides for a computer program product stored on a computer usable medium for determining a misfire condition of an internal combustion engine having one or more cylinders, comprising, a computer readable program for causing a computer to control an execution of an application within a memory control device in operable communications with an engine. Preferably, the computer readable program when executed by a computer provides for: determining a first process by comparing if a first load variable (FLV) is greater than a first estimated load variable (FELV) for a first cylinder of the engine; determining an exhaust manifold pressure (EMP), executing the first process and calculating an operating value (OV) in relation to the one or more data inputs of engine characteristics, and a comparative value (CV) associated with a threshold value; comparing the OV and the CV, and, detect a misfire condition for the first cylinder. Preferably, the present invention may be configured for use in, as or with a vehicle, an engine (diesel, spark-ignited, gasoline, natural gas, hybrid, etc.), a diagnostic tool, a computer system or similar.

In a further embodiment, the present invention provides for a method of monitoring and detecting EMP fluctuations in combination with one or more sensed engine characteristics to determine an engine cylinder misfire in a cycle of an internal combustion engine having at least one cylinder. The method includes measuring an EMP, determining a signal filtered output from the EMP using a signal filter, and computing a root mean square (RMS) of one or more extracted relevant frequencies. Preferably the method also includes identifying a predetermined misfire threshold, comparing the computed RMS with the misfire threshold, and detecting a misfire condition for the cycle. Further the method may also detect EMP fluctuations in combination with one or more sensed engine characteristics to determine the occurrence of a misfire condition.

In still a further preferred embodiment, a diesel engine configured to detect an engine cylinder misfire is provided. In the preferred embodiment, the engine comprises logic for: comparing a first load variable (FLV) with an first estimated load variable (FELV) for one or more cylinders of the engine and initiating a first process being of one of an estimated exhaust manifold pressure process (EEMPP) or a centroid projection process (CPP); measuring an exhaust manifold pressure (EMP), using the first process, calculating an operating value (OV) in relation to one or more data inputs of engine characteristics and a comparative value (CV) associated with a threshold value; comparing the OV and the CV, and, detecting a misfire condition for the one or more cylinders of the diesel engine.

In a preferred embodiment, an engine having logic of the present invention is able to determine a relationship between the FLV and FELV, where wherein if the FLV is less than the FELV, the initiated first process initiated is the EEMPP, and wherein if the FLV is not less than the FELV, the logic initiated as the first process is the CPP.

Further embodiments, forms, objects, features, advantages, aspects, and benefits of the present application shall become apparent from the detailed description and drawings included herein.

DETAILED DESCRIPTION OF THE ILLUSTRATIVE EMBODIMENTS

Figure 1:
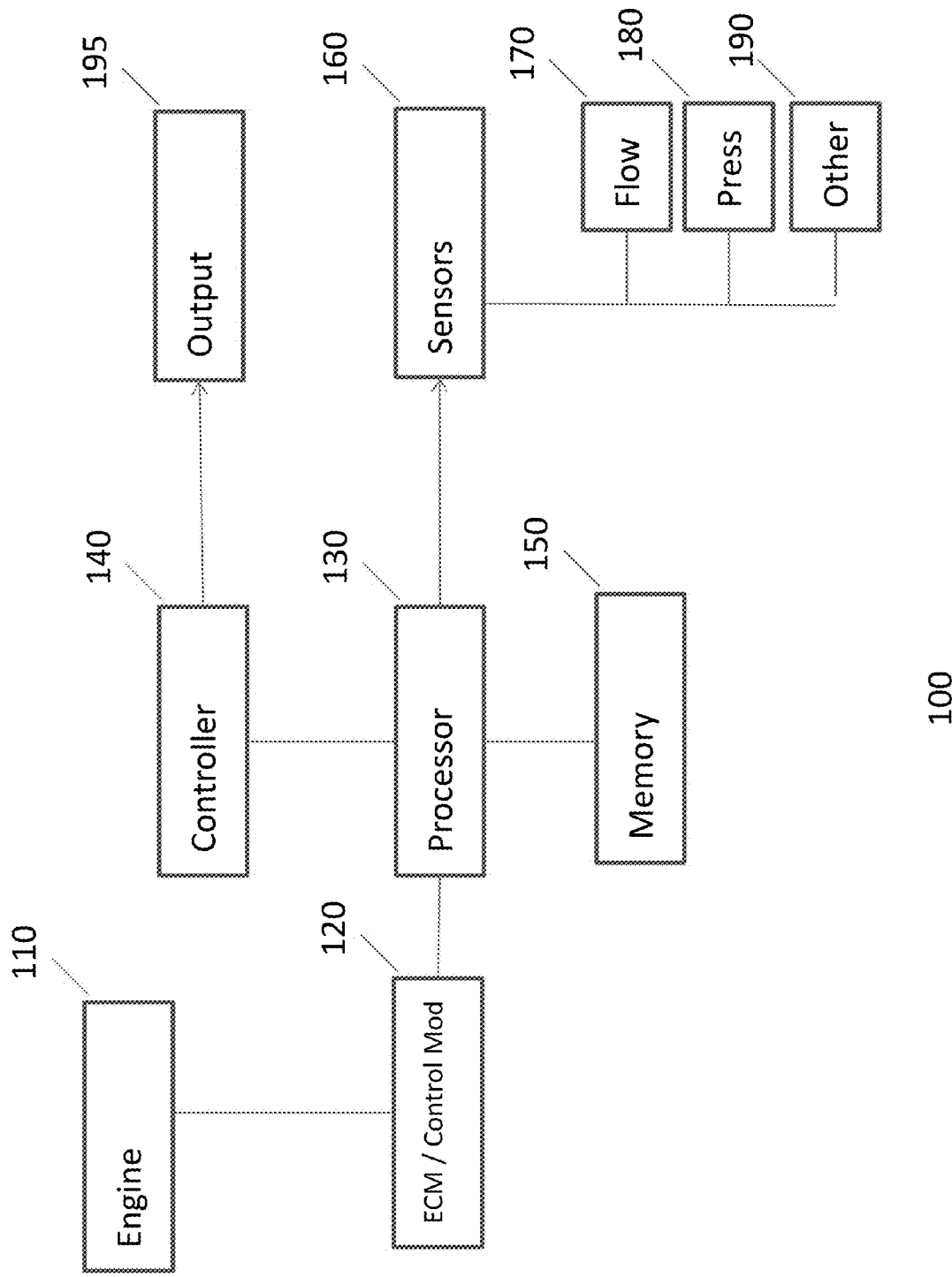
FIG. 1 is an illustration of a block diagram of one form of the control system 100 of the present invention in accordance with an embodiment of the present invention.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations, modifications, and further applications of the principles of the present invention as illustrated herein being contemplated as would normally occur to one skilled in the art to which the invention relates.

The present invention provides for a method, control system, computer program product providing a control method for determining a misfire condition of an engine cylinder over known approaches and is applicable for engines. The present invention in one or more embodiment contemplates the use of multiple actuator approaches alone or in combination, serially or concurrent, singularly or in parallel, and at times predetermined as well as those of actual or forecasted events.

FIG. 1 is an illustration of a block diagram of one form of the control system 100 of the present invention in accordance with an embodiment of the present invention. In FIG. 1, an internal combustion engine 110 is in communication with an engine control module (ECM) 120 which provides control information for the operation of the engine. The ECM 120 is in communication with a processor 130 of the control system which is in communication with a controller 140 for controlling the operation of the present invention, though other configurations are also envisioned by the present invention. System memory 150 is associated with the system processor 130 and may retain information associated with the operation and activities of the present invention. Sensor(s) for measuring and receiving information from measured sources associated with the engine operation is located at 160 and is in communication with the system processor 130 and controller 140.

In a preferred embodiment, actuators, not pictured, may also be associated with the sensors and may be controlled by the controller for turning on/off the measurement and gathering of data inputs of the engine operation associated with the sensors. Exemplary sensors 160 may include an air flow sensor 170, an exhaust manifold pressure sensor 180, and data sensor(s) 190 associated with other engine operations and characteristics (such as but not limited to exhaust manifold pressure (EMP), engine speed, fuel quantity, mass air flow (MAF), Exhaust gas Recirculation (EGR) pressure, ambient pressure, turbine speed and turbine position, etc.). In a preferred embodiment, a misfire condition that is determined using the present invention may be communicated to one or more of the ECM 120, the memory 150, and a data output 195 (e.g., data port, display, printer, etc.). In a further preferred embodiment, an A/D converter may also be associated with each sensor in order to convert the sensed data in an appropriate data format for processing by the present invention.

Figure 2A:
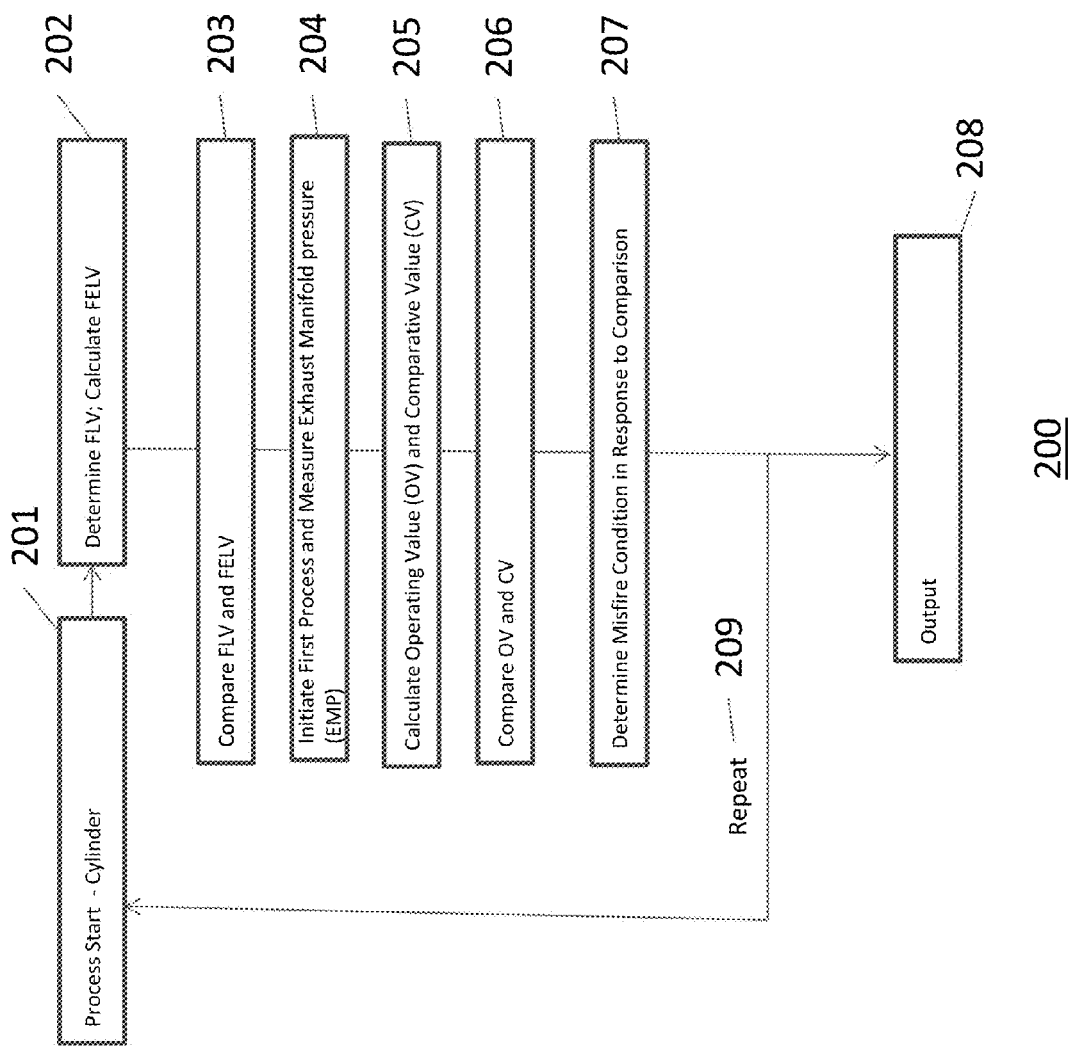
FIG. 2A is a block diagram of the method of the present invention in accordance with one or more embodiments thereof.

FIG. 2A is a block diagram of the method 200 of the present invention in accordance with one or more embodiments thereof. From FIG. 2A, the process starts at 201 for a particular cylinder of the engine. At 202, a first load variable (FLV) is measured using one or more data inputs from sensed data or other sourced data in relation to the engine, engine operation or operating characteristics of the engine. The FLV is an indicator of the load in a stoic engine. Similarly, at 202, a first estimated load variable (FELV) is calculated in relation to the engine type or operating conditions of the engine. At 203, the FLV and FELV are compared and a first process of the present invention is initiated at 204 in response to the comparison at 203. Once the process is initiated, the process then calculates an operating value (OV) and a comparative value (CV) associated with the particular first process initiated at 205, which are further detailed below. At 206, the OV and CV are compared in order to determine a particular misfire condition result, which is then determined at 207. The misfire condition is preferably output at 208 and the process of the present invention may continue for another cylinder of the engine at 209.

It will be appreciated that the process of FIG. 2A has many applications to a variety of engine types in operation. As used herein, it will be appreciated that the present invention may employ a number of various characteristics for engine load, performance and activity for the FLV and FELV. By example, the FLV may be one or more of an engine characteristic, engine load, fuel quantity, mass charge flow (MCF), fresh air flow (FAF), flow rate, and the FELV may be one or more of an estimated engine characteristic, estimated engine load, estimated fuel quantity, estimated mass charge flow (EMCF), estimated fresh air flow (EFAF), estimated flow rate, associated with the FLV.

Figure 2B:
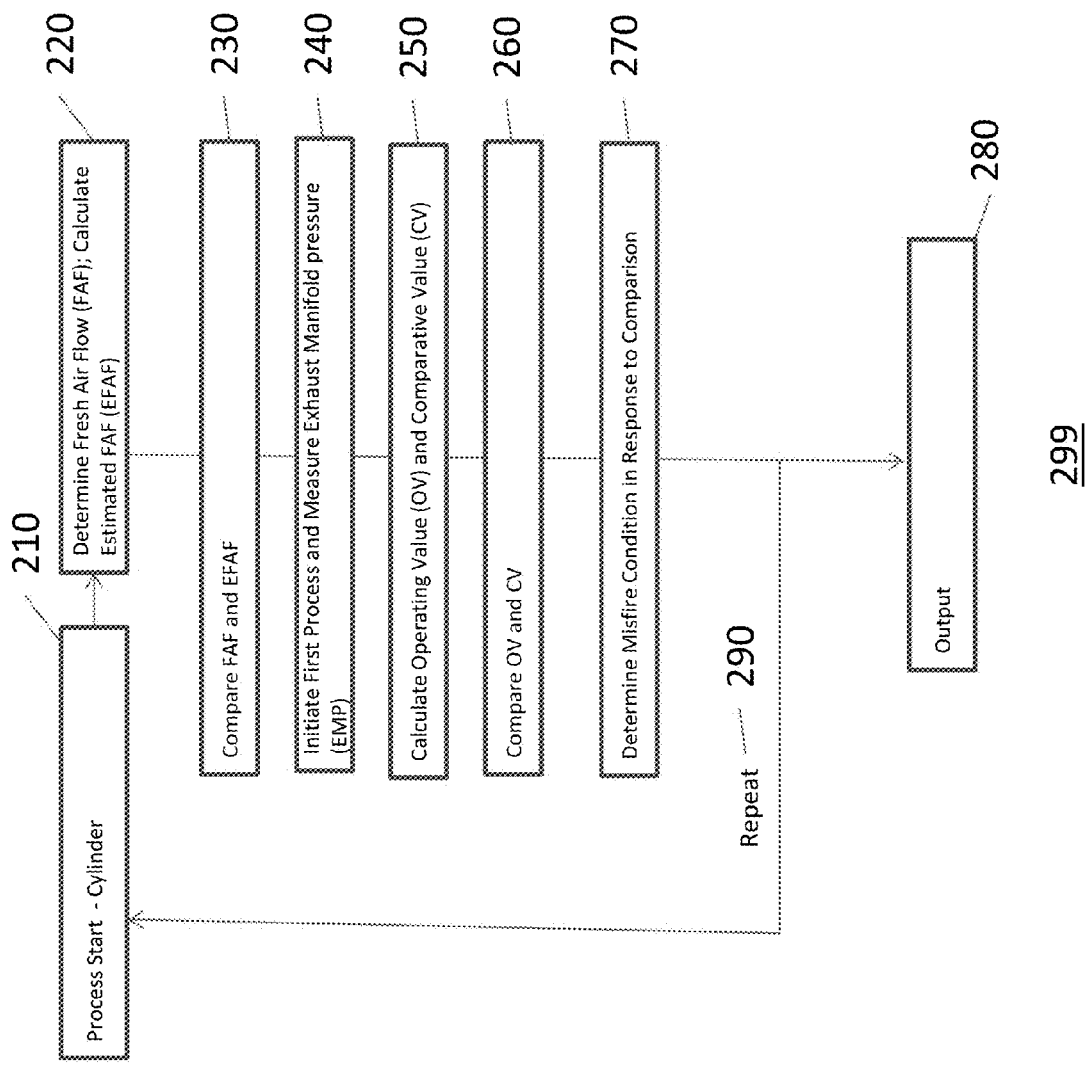
FIG. 2B is a block diagram of an implementation of a method of the present invention in accordance with one or more embodiments thereof.

FIG. 2B is a block diagram of an implementation of the method 299 of the present invention in accordance with one or more embodiments thereof. From FIG. 2B, the process presents an implementation of the FLV being a fresh air flow (FAF) and the FELV is an estimated fresh air flow (EFAF). The process of FIG. 2B starts at 210 for a particular cylinder of the engine. At 220, the FAF is measured using one or more data inputs from sensed data or other sourced data in relation to the engine, engine operation or operating characteristics of the engine. The fresh air flow is an indicator of the load in a stoic engine; this can be replaced with fuel quantity or any other such indicators of load. Similarly, at 220, the EFAF is calculated in relation to the engine type or operating conditions of the engine. At 230, the FAF and EFAF are compared and a first process of the present invention is initiated at 240 in response to the comparison at 230. Once the process is initiated, the process then calculates an operating value (OV) and a comparative value (CV) associated with the particular first process initiated at 250, which are further detailed below. At 260, the OV and CV are compared in order to determine a particular misfire condition result, which is then determined at 270. The misfire condition is preferably output at 280 and the process of the present invention may continue for another cylinder of the engine at 290.

Figure 3:
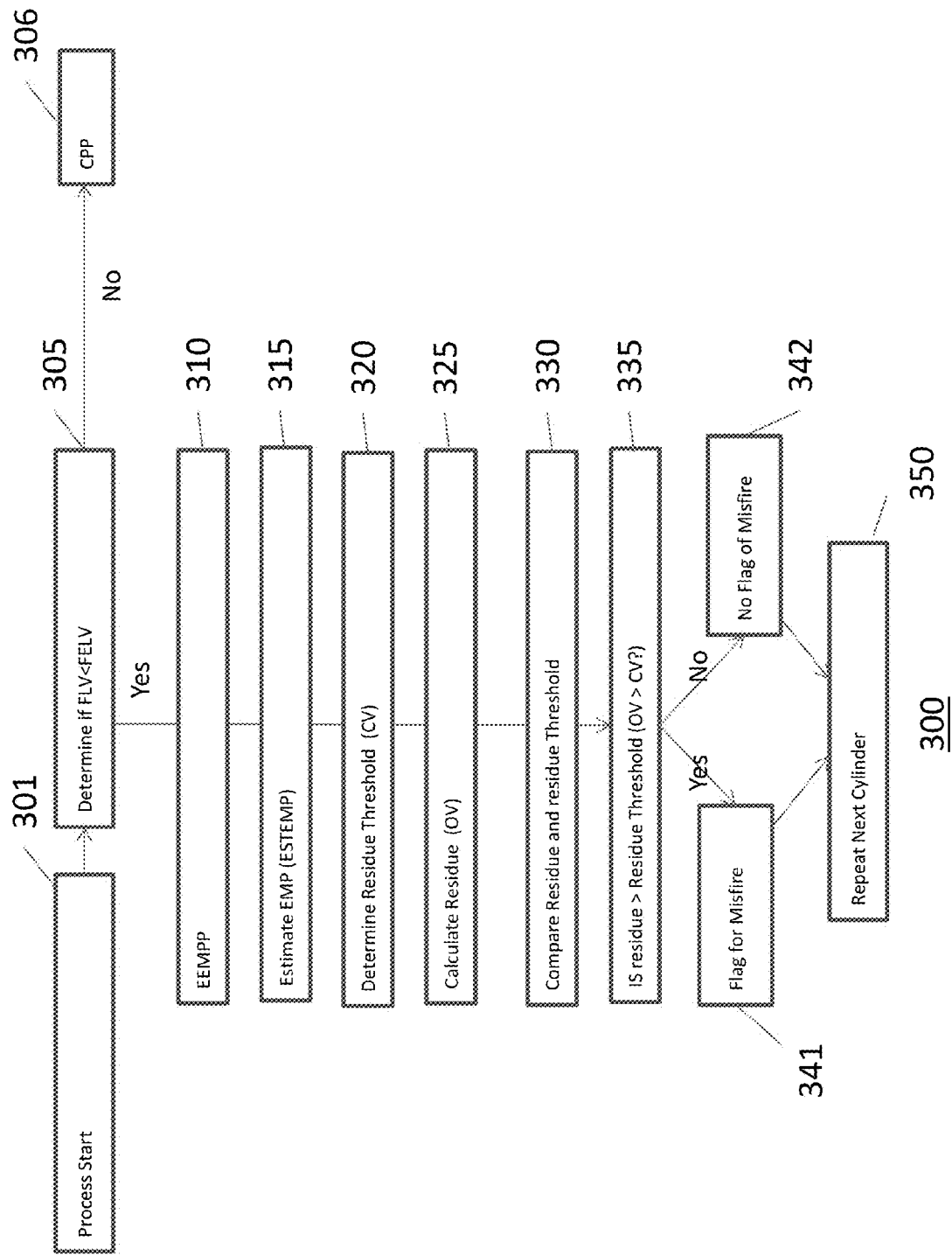
FIG. 3 is a block diagram of additional processing of a method of the present invention involving the step of an estimated exhaust manifold pressure process (EEMPP), in accordance with one or more embodiments thereof.

FIG. 3 is a block diagram 300 of additional processing of a method of the present invention involving the step of an estimated exhaust manifold pressure process (EEMPP), in accordance with one or more embodiments thereof. From FIG. 3, the process of the present invention starts at 301 for a particular cylinder of the engine where a determination of whether the FLV is greater than the FELV in made at 305. It will be appreciated that the present invention provides for various methods for determining the FELV, measuring the FLV and comparing the two, as stated herein. Where the FLV is not greater than the FELV, the CPP is selected by the present invention at 306 (which is discussed elsewhere herein). Where the FLV is greater than the FELV, the EEMPP process is selected at 310 by the present invention.

At 310, the EEMPP process includes estimating the EMP (ESTEMP) at 315, where such estimation may be performed by estimation calculations including the use of algorithmic software, table look ups in relation to the engine and/or operation type, and similar other characteristics of the specific engine and/or its operation. In one or more preferred embodiments, the ESTEMP may be determined as a function of time over an exponential moving average. The estimation can also be done using a higher order model that includes the change in exhaust manifold pressure over each iteration. Further, a physics based model or an empirical model can also be used. Some examples of such may include:

$$\text{ESTEMP} = f(\text{EMP}(t-1), \ldots \text{EMP}(t-k), \text{diag}(t-1), \ldots \text{diag}(t-k);$$

or:
EWMA Model $$\tilde{P}_e(t) = \begin{cases} \alpha P_e(t-1) + (1-\alpha)\tilde{P}_e(t-1) & \text{if } d(t-1) = 0 \\ \beta P_e(t-1) + (1-\beta)\tilde{P}_e(t-1) & \text{if } d(t-1) = 1 \end{cases}$$

$$\alpha \gg \beta$$

Second Order Model $$\tilde{P}_e(t) = P_e(t-1) + \Delta P_e(t-1) +$$
$$(1-\alpha_1)(\tilde{P}_e(t-1) - P_e(t-1)) + (1-\alpha_2)(\Delta P_e(t-1) - \Delta P_e(t-1)),$$
$$\text{if } d(t-1) = 0$$

$$\tilde{P}_e(t) = P_e(t-1) + \Delta P_e(t-1) +$$
$$(1-\alpha_1)(\tilde{P}_e(t-1) - P_e(t-1)) + \Delta P_e(mcf(t), vgt(t)),$$
$$\text{if } d(t-1) = 1$$

$\Delta P_e$ (mcf(t), vgt(t)) is a calibratable/empirical model, parameterized by charge flow and vgt position obtained from misfiring cylinder data.

Physics Based Model $$\tilde{P}_e(t)=P_e(t-1)+(1-\alpha)(\tilde{P}_e(t-1)-P_e(t-1))+d(P_e), \text{ if } d(t-1)=0$$

$$\tilde{P}_e(t)=P_e(t-1)+(1-\alpha)(\tilde{P}_e(t-1)-P_e(t-1))+d(P_e)+\Delta P_e(mcf(t),vgt(t)),$$

if $d(t-1)=1$ $d(P_e)/d(mcf)=K(vgt)$ is a calibratable/empirical model, parameterized by charge flow and vgt.

$\Delta P_e(mcf(t),vgt(t))$ is a calibratable/empirical model, parameterized by charge flow and vgt position obtained from misfiring cylinder data.

At 320, the residue threshold (also used as CV) is determined, preferably as a function of turbocharger position (e.g. variable geometry turbocharger (VGT) position), for instance, though other characteristic functions and operational conditions may also be used.

At 325, the residue (also used as OV) is determined as the difference between the EMP and the ESTEMP. A comparison of the residue and the residue threshold is then performed at 330. At 335, if the residue is greater than the residue threshold (i.e., OV>CV), then a flag for misfire is determined at 341. At 335, if the residue is not greater than the residue threshold (i.e., OV>CV), then no misfire flag is determined at 342. At 350, the process moves forward to evaluate a next cylinder of the engine.

Figure 4:
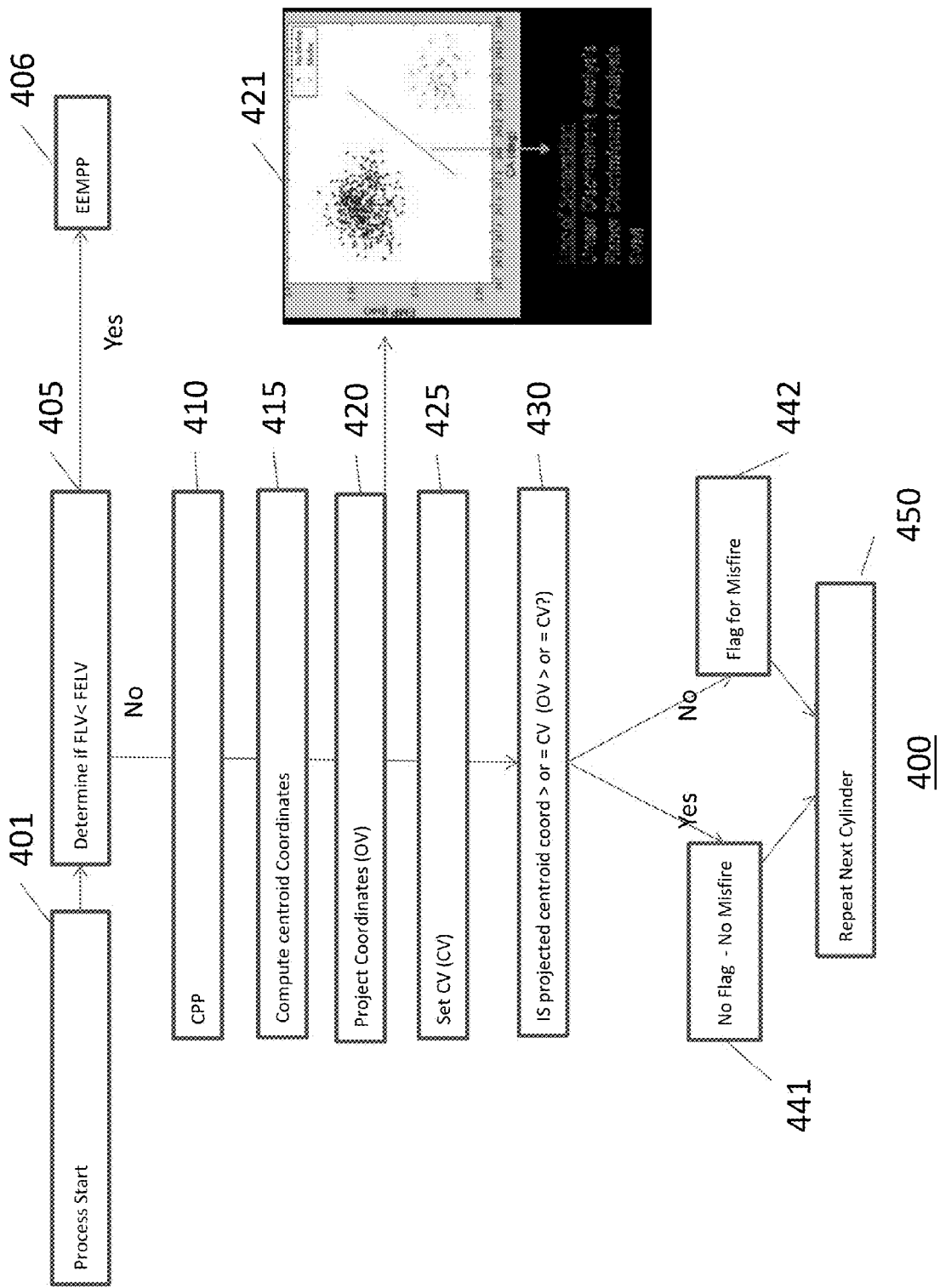
FIG. 4 is a block diagram of additional processing of a method of the present invention involving the step of a centroid projection process (CPP), in accordance with one or more embodiments thereof.

FIG. 4 is a block diagram 400 of additional processing of a method of the present invention involving the step of a centroid projection process (CPP), in accordance with one or more embodiments thereof. From FIG. 4, the process of the present invention starts at 401 for a particular cylinder of the engine where a determination of whether the FLV is greater than the FELV in made at 405. It will be appreciated that the present invention provides for various methods for determining the FELV, measuring the FLV and comparing the two, as stated herein.

Where the FLV is greater than the FELV, the EEMPP process is selected at 406 by the present invention. Where the FLV is not greater than the FELV, the CPP is selected by the present invention at 410.

At 410, the CPP process includes computing centroid coordinates at 315, where such estimation may be performed by estimation calculations including the use of algorithmic software, table look ups in relation to the engine and/or operation type, and similar other characteristics of the specific engine and/or its operation. It will be appreciated that the CPP is often performed, though not necessarily, when conditions yield low flow conditions. When implemented, the CPP uses the centroids of the EMP signal to determine the occurrence of a misfire. For the present invention, the centroids capture the location and magnitude of the energy EMP signal for each cylinder in the operation.

At 420, the present invention then projects the coordinates (i.e., OV) onto a line of separation, predetermined from test data. It will be appreciated that any statistical pattern classification technique such as Linear Discernment Analysis, Fisher Discernment Analysis, and Support Vector Machines etc. may be used to determine this line of separation under the present invention. Preferably, Projection: Centroid_y-A*Centroid_x-B, where A and B are coefficients of the line of separation. An example of a projection of the coordinates onto a line of separation for a representative test result is at 421.

At 425 the CV is determined, and in one or more preferred embodiments, the CV is set equal to zero. At 430, the process determines if the projected centroid coordinates are greater than or equal to the CV (i.e., OV> or =CV). At 441, where it is determined that the projected centroid coordinates are greater than or equal to the CV, a determination of no misfire is made and no flag is set to indicate a misfire. At 442, where it is determined that the projected centroid coordinates are not greater than nor equal to the CV, a determination of misfire is made and a flag is set to indicate a misfire.

At 450, the process moves forward to evaluate a next cylinder of the engine.

Figure 5:
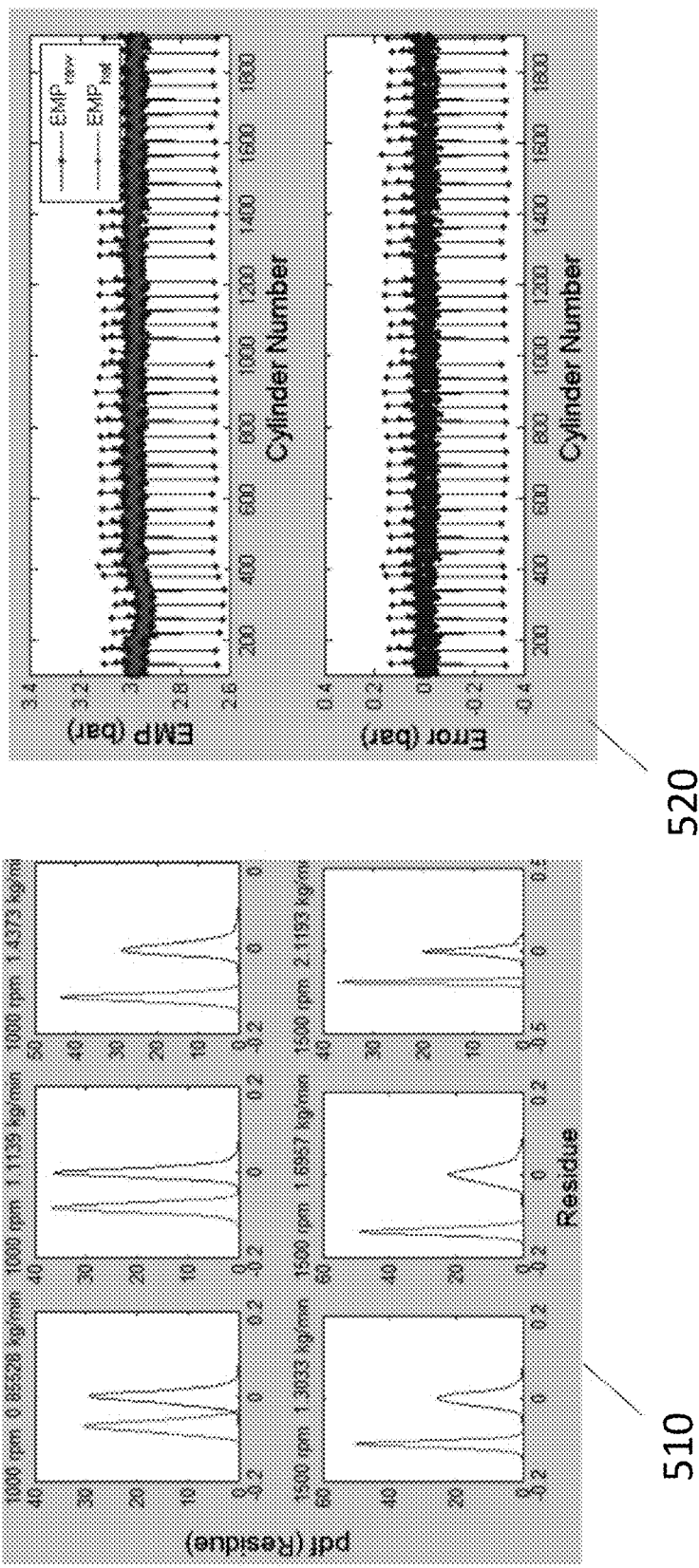
FIG. 5 depicts representative results using the present invention, in accordance with one or more embodiments thereof; and, FIG. 6 depicts an overall view of a spark ignition type internal combustion engine having a controller means in communication with the spark igniter, fuel injector and an EGR configuration capable of operating with the present invention.

FIG. 5 depicts representative results using the present invention, in accordance with one or more embodiments thereof. From FIG. 5, at 510, the EMP versus the cylinder is depicted where using the present invention data representing spikes in the residue signal are shown thereby identifying the misfiring cylinders. Similarly, at 520, the probability density functions of the residuals are evaluated using the method of the present invention, where a showing of the separation between normal and misfiring cylinders' data at various conditions is set forth.

Figure 6:
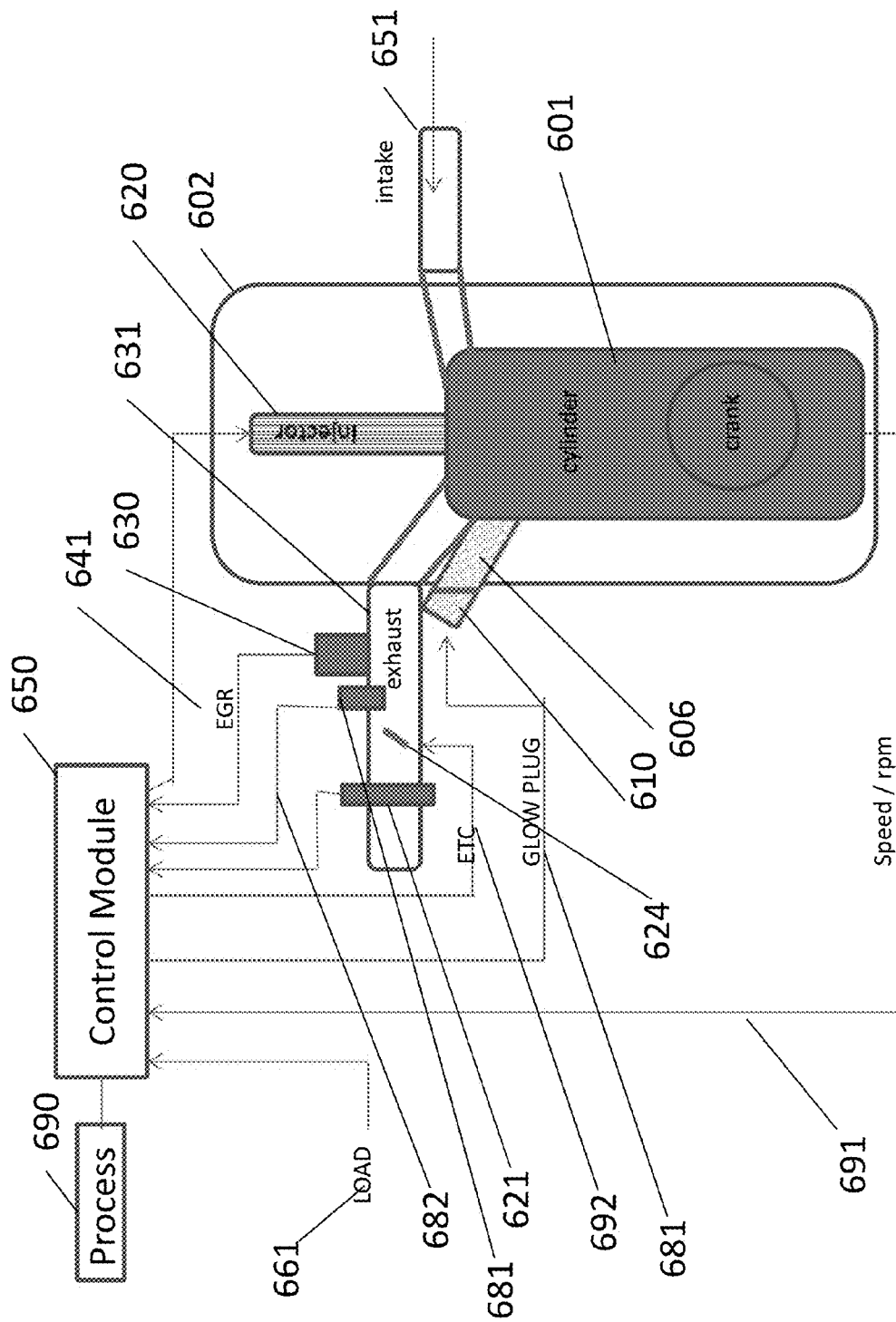

FIG. 6 depicts an overall view of a spark ignition type internal combustion engine 600 having a controller means 650 in communication with the spark igniter 610, fuel injector 620 and an EGR configuration 630 capable of operating with the present invention. From FIG. 6, 601 indicates a crank case with cylinder and piston, 602 a cylinder block, wherein is also located at the upper portion a combustion chamber. Also in FIG. 6 is included at 606 a spark plug arranged at the center of a top surface of the combustion chamber 607 in communication through an igniter via 681 with the controller 650. Further an air intake port is located at 651, an exhaust port at 631 and a NOx sensor at 681 in communication with the controller at 682.

At the upper portion of the block 602 is also included, but not diagrammed, intake ports connected through intake branch pipes which have fuel injectors arranged in them for injecting fuel toward corresponding intake ports. An exemplary depiction of a fuel injector is set forth at 620 though the present invention may also use a high pressure rail configuration and is not otherwise so limited. Further, the fuel injectors may also be arranged inside the combustion chambers instead of being attached to the intake branch pipes under the present invention.

An exhaust port 631 is connected through an exhaust manifold where inside the exhaust manifold is typically an air-fuel ratio sensor 621 in communication with the controller 650. The exhaust manifold and the intake branch pipes are connected with each other through EGR passage (not shown) connected via an EGR valve 630 for an exhaust gas recirculation (referred to as "EGR gas") in communication with the controller 550 via 541. An exhaust gas gate is also provided at 524.

Typically inside the EGR is included an EGR control valve 630 is arranged, where around the EGR passage is an EGR cooling device for cooling the EGR gas flowing through the inside of the EGR passage. As used herein, the EGR passage, EGR control valve, and EGR cooling device are referred to together as the "EGR mechanism". Load on the engine is determined from inputs of 661 and such is in communication with the controller 650.

An example of an EGR configuration suitable for use with the present invention is that discussed in U.S. Patent Application 20100147272 entitled "Exhaust Gas Recirculation Cooler Coolant Plumbing Configuration" the teachings if which are incorporated herein by reference. In U.S. Patent Application 20100147272, the cooling system may comprise a heat exchanger, a pump coupled to the heat exchanger, an EGR cooler coupled to the pump, and a first valve coupled to the EGR cooler and the heat exchanger. The configuration utilizes a valve to maximize the rate a coolant flows throughout the system when the valve is in an open position and also to warm up an engine when the valve is in a closed position.

Inputs derived from operation of the engine determine speed of the engine and are in communication with the controller 650 at 691. Similarly, exhaust gas temperature can be monitored by sensor and communicated via 692 to the controller 650 as can be crank angle (crank angle sensor not shown) also in communication with the controller 650.

The controller 650 is preferably an electronic control unit comprised of a digital computer, which may include a programmable computer product of the present invention for instance, and include components connected with and in communication with one another through a back bone circuit or other bidirectional bus such as a ROM (read only memory), RAM (random access memory), CPU (microprocessor), input port, and output port, by example. The present invention may also be a circuit, application, logic, software or other electronic means within a controller as 650 or separate and in communication with the controller 650 as well.

The misfire determination process of the present invention 690 receives and transmits data with the controller of the engine 650 (i.e., ECM, controller, data port, etc.) and processes the data in accordance with the steps of the present invention to determine whether a misfire is present for a cylinder of the engine. It will be appreciated by those skilled in the art that there are many variants for connecting and communicating data of the engine with the present invention and that the diagrams of the Figures herein are not intended to be so restricted.

In operation an output signal 682 of the sensed knock from the NOx sensor 681 is input through a corresponding analog-to-digital converter (A/D) typically. In operation, various sensors described previously herein may be placed at various operating points within and along the engine to determine FAF, EMP, VGT position, engine speed, MAF, EGR pressure, ambient pressure, turbine speed, turbine position and other engine characteristics and operating characteristics that would be included as data input for use by and with the present invention (inclusive of "data input of engine characteristics," and/or "sensed data input").

Figure 7:
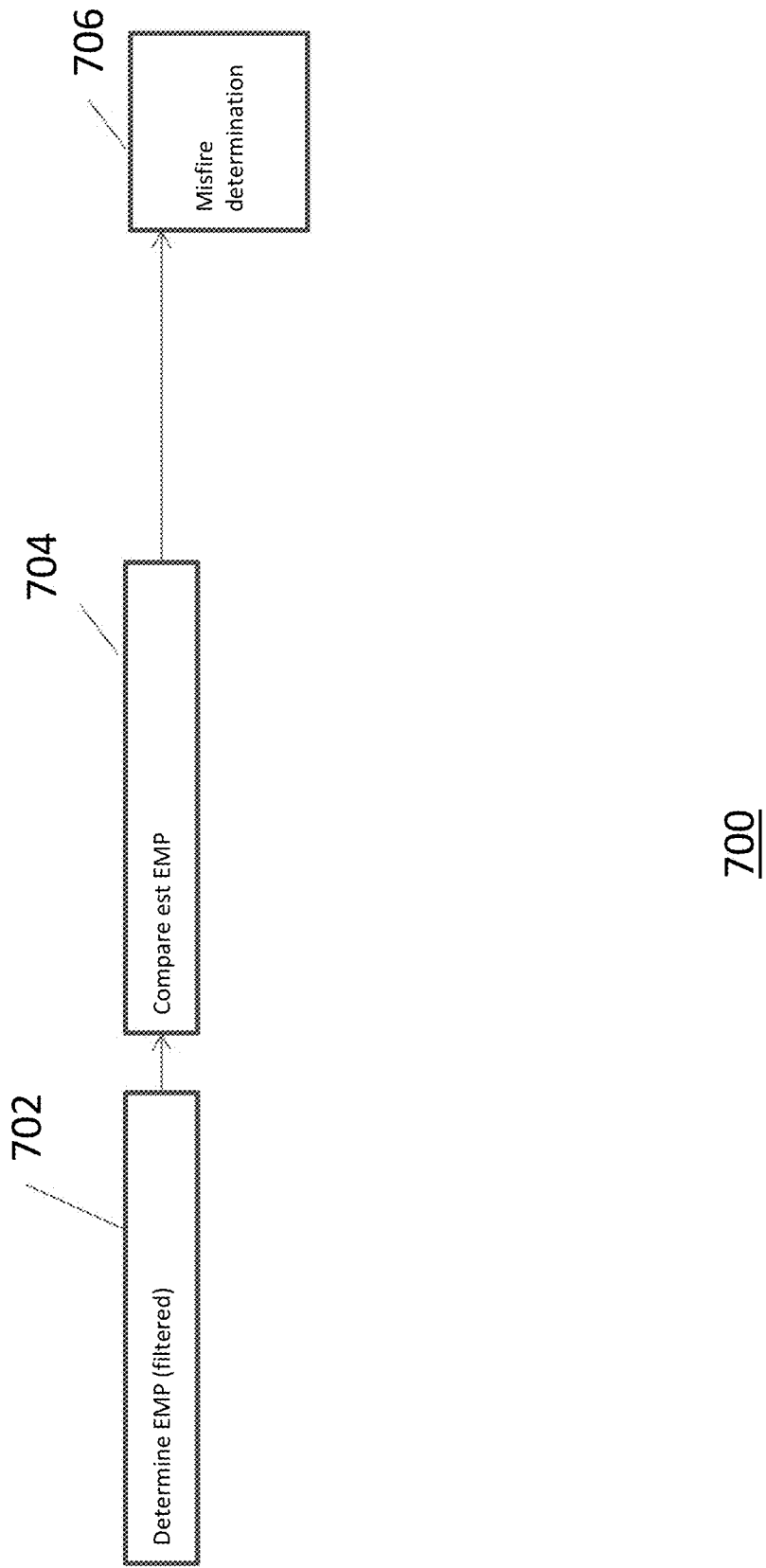
FIG. 7 is a flow chart of a slow diagnostic method in accordance with an embodiment.

A further embodiment of the present includes having a slow diagnostic method in which a continuous misfire is sought for in one and multiple cylinders. In one embodiment, a slow monitor approach uses a mean value model of the EMP to determine continuous misfire. FIG. 7 is a flow chart of a slow diagnostic method in accordance with an embodiment. First, a filtered value of the EMP is determined, via step 702. Then, the filtered value of the EMP is compared with an estimated EMP, via step 704. Finally, a misfire in one or more cylinders is determined based on the comparison, via step 706. The slow monitor of the present invention (i.e., slow monitor filter) is operated on a filtered EMP to provide only cycle to cycle estimates. This slow monitor filter approach may also be a diagnostic that is used to determine continuous misfire in one or multiple cylinders and as affirmative check. The slow diagnostic looks for continuous misfire in one and multiple cylinders. It looks at a filtered value of EMP and compares it with an estimated EMP. The estimate of the EMP is determined by a calibration between EMP, Fresh Air Flow, VGT position and turbo speed. A mean value model that estimates the pressure ratio based on the inversion of the turbo map can also be used in conjunction with the present invention. In a preferred embodiment, the slow monitor filter model uses the charge flow, turbo speed and VGT position to calculate the turbo pressure ratio from the turbo maps, and then estimates the EMP either by measuring or estimate the turbo out pressure.

Similarly, in one or more preferred embodiments of the present invention the control the control system includes a plurality of actuation controllers being in communication with the one or more data input sensors. Additionally, a data processor of the present invention is preferably connected with the at least one data input sensor, and may receive or transmit a sensed data input.

In another preferred embodiment, for the EEMPP process, the residue threshold is the CV and the residue is the OV; and for the CPP, the CV is a value of any projected centroid coordinates and the CV is less than one. Additionally, in a further aspect, wherein if the residue is greater than the residue threshold, then a misfire condition may be determined by the present invention as being present. Further the CV may be of any value, positive or negative, including zero, particularly for the CPP.

In a further embodiment of the present invention, a method of monitoring and detecting EMP fluctuations in combination with one or more sensed engine characteristics to determine the occurrence of a misfire is provided.

In a preferred embodiment, the present invention uses the frequency content of the EMP signal to detect misfire.

EMP fluctuation may arise in a variety of ways including by opening a cylinder exhaust valve and inputting in combusted gases into the exhaust. Since the opening of the exhaust valves is a periodic-based process, it will be appreciated that the EMP has a strong periodic component associated with it and is generally unaffected by engine transients, for the present invention. Therefore, where a misfire occurs in one or more of the cylinders, energy is disrupted in the associated frequency range. The present invention advantageously determines the misfire information in relation to the associated frequencies, where this information is generally representative of operating conditions.

In a preferred embodiment, the present invention uses a filter to extract out the relevant frequencies and determine magnitude of the filtered component. In operation, as a misfire induces a transient in the filter output, the transient can be used to detect, by the present invention, the misfire. In one or more preferred embodiments, a notch filter or a bandpass filter may be used to extract the relevant frequency component.

To detect a misfire in one cylinder of an engine using the present invention, the magnitude of EMP at the engine speed frequency is extracted. Advantageously, to detect two consecutive cylinder misfires, the associated frequency may be determined as twice the rotating speed, etc. A notch filter is designed and employed for use with the present invention where the residue of the filter output is used in the misfire detection sequence.

Figure 8:
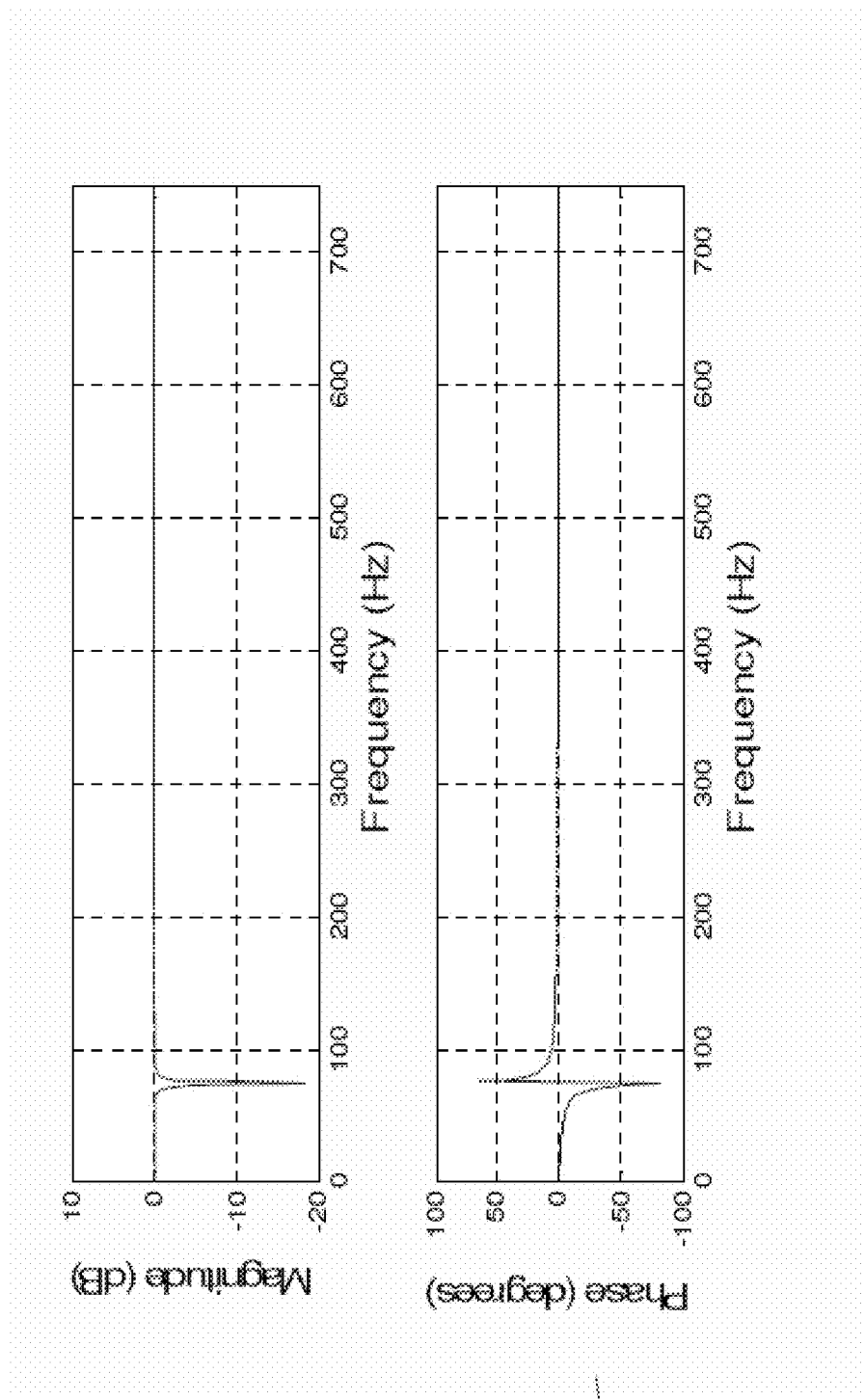
FIG. 8 sets forth the results of magnitude versus frequency and of phase versus frequency, in accordance with an aspect of the present invention.

In a preferred embodiment, in the crank domain, the filters may preferably be independent of speed and depend only on the number of samples per revolution. By way of example, the notch filter's response using the present invention is depicted in FIG. 8 at 800 where it can be seen the results of magnitude versus frequency at 810 and of phase versus frequency at 820.

Figure 9:
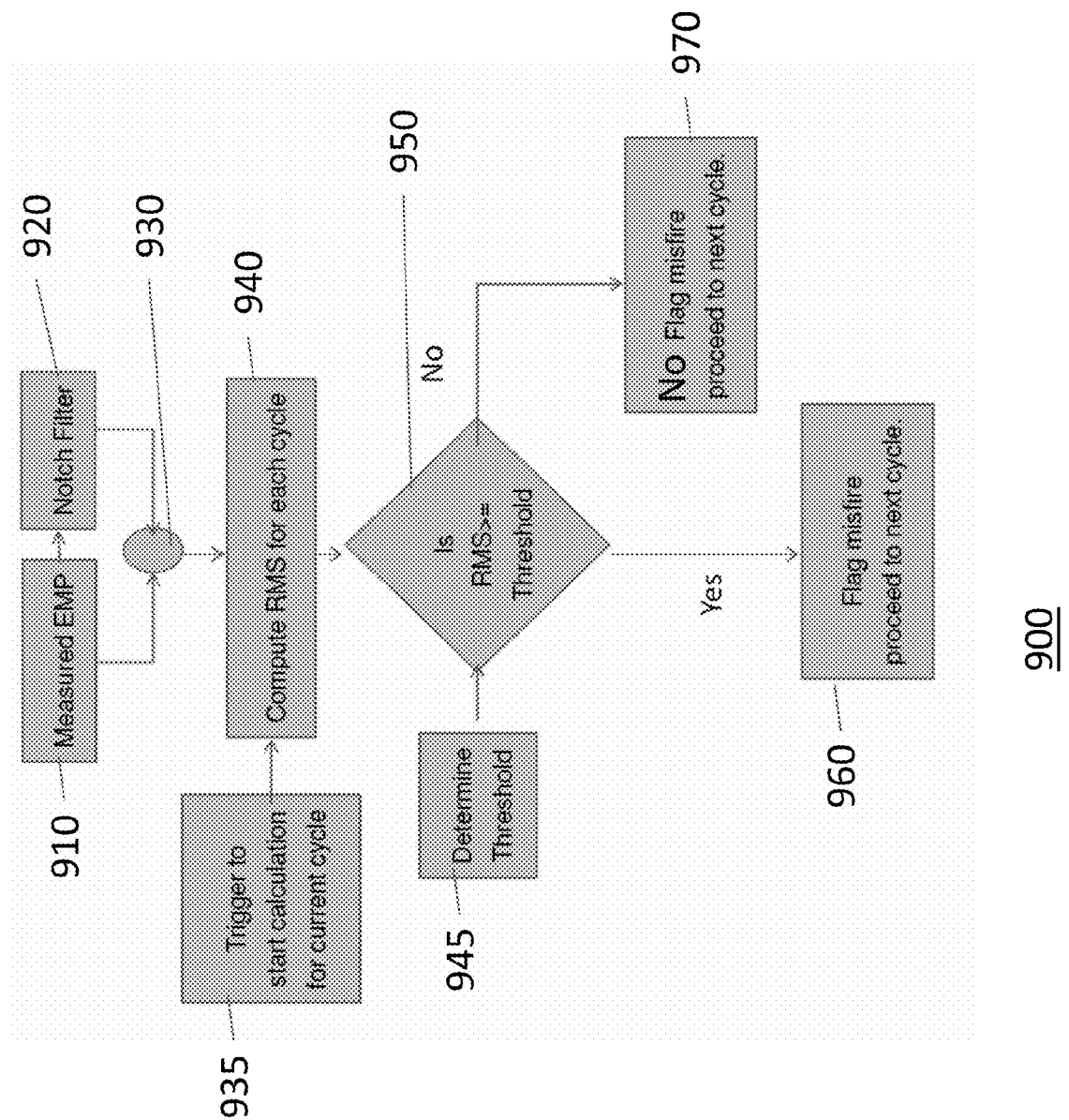
FIG. 9 sets forth a flowchart of the method of a preferred embodiment of the present invention in which one or more sensed engine characteristics are used to determine an engine cylinder misfire in an internal combustion engine having at least one cylinder.

FIG. 9 sets forth a flowchart 900 of the method of a preferred embodiment of the present invention in which one or more sensed engine characteristics are used to determine an engine cylinder misfire in an internal combustion engine having at least one cylinder. From FIG. 9, an EMP is measured or extracted at 910 whereafter the notch filter is deployed at 920, for a notch filter response, and the filter output is used in the misfire detection sequence at 930. At 930, the output of the notch filter and the measured EMP are utilized and following the initiation of the calculation at 935, a computation of the root mean square (RMS) for each cycle is determined at 940. A threshold value is determined at 945 and the output of the RMS computation is compared with the predetermined threshold at 950 to determine whether a misfire has occurred. In the event the RMS computation is greater than or equal to the threshold, a flag indicating a misfire is designated at 960. In the event the RMS computation is less than the threshold, a flag indicating a no misfire is designated at 970.

Figure 10:
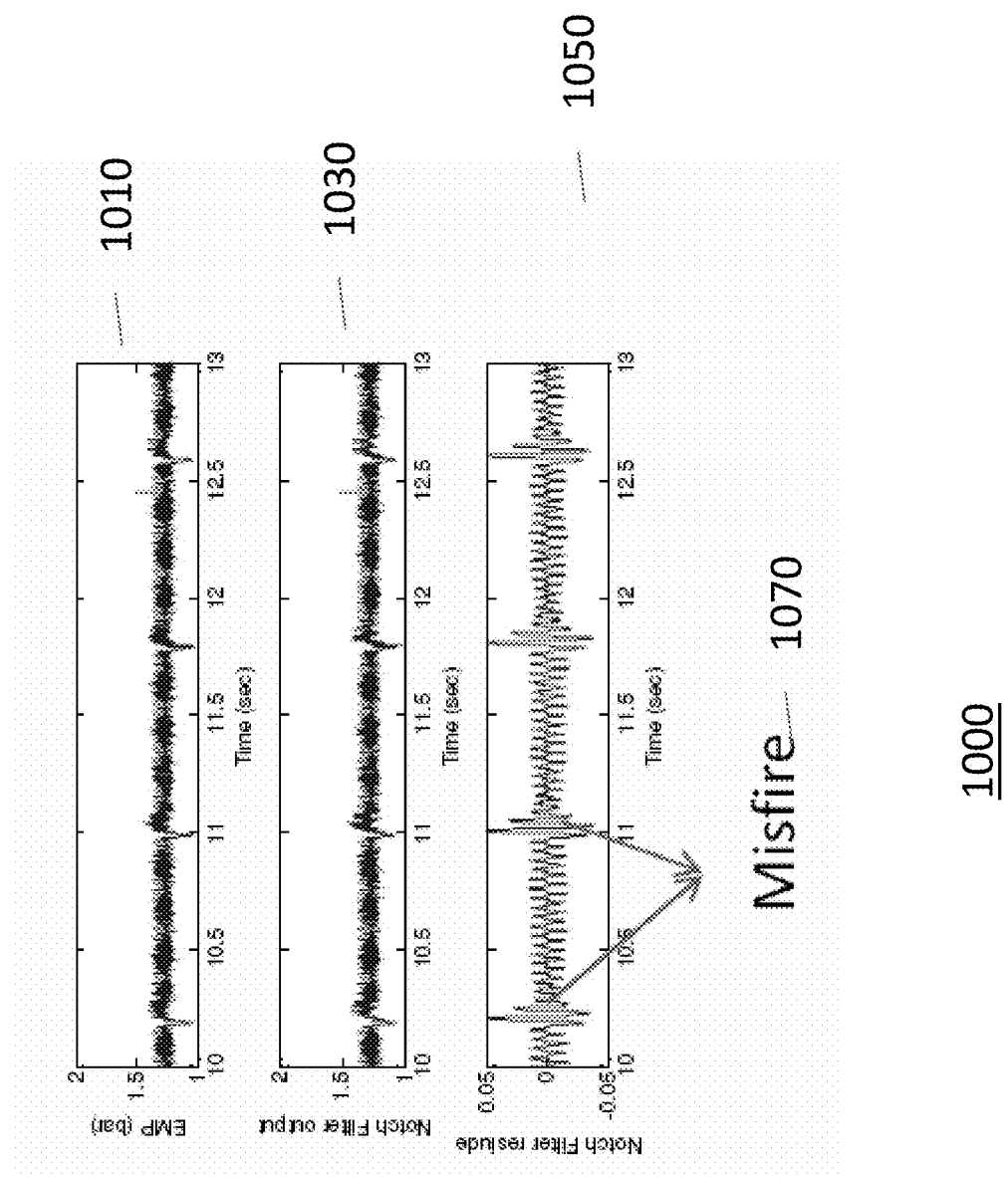
FIG. 10 sets forth a depiction of the EMP, the notch filter output, the notch filter residue, and the effect of misfire.

FIG. 10 sets forth a depiction 1000 of the EMP, at 1010, the notch filter output, at 1030, the notch filter residue, at 1050, and the effect of misfire at 1070.

Advantageously, the method of the present invention eliminates the need to specifically tune monitor each vehicle for a particular engine as the sensitivity to vehicle dynamics is substantially reduced. It will be appreciated by those skilled in the art that there are many variations to the steps above that may be undertaken or altered while remaining within the scope of the present invention.

As used herein, various engines may be used with the present invention and preferably those that are spark-ignited, have fuel injection, and are capable of EGR. However, the invention is not so limited whereas it is contemplated by the present invention that additional or alternate actuation approaches may be within the present scope and can be operated with or implemented upon engines that are configured to support such associated actuation. It is further envisioned that engines ideally benefiting from various embodiments hereinunder will have controllers on sub-systems and components which will be in operable communication with one another to support commands involving actuation that may be results of operation of the present invention.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

Moreover, the present invention may be developed to meet the requirements of CARB OBD II set by the California Regulations Board or similar.

The present invention may be used in a variety of engines and engine types, including by example, an internal combustion engine, a diesel engine, a hybrid engine system, and a battery-driven engine.

The system described herein detects engine misfires preferably when a vehicle is in operation. By detecting misfires efficiently and accurately as described above, the present invention provides a system and method to reduce engine wear using a cost effective approach.

While the invention has been described with reference to the aforementioned embodiments, it should be appreciated by those skilled in the art that the invention may be practiced otherwise than as specifically described herein without departing from the spirit and scope of the invention. It is therefore understood that the spirit and scope of the invention be limited only by the appended claims.

The system and method for detecting engine cylinder misfire in internal combustion engines has obvious industrial applicability including that which would be useful in any environment where a user desires to constantly monitor the average peak exhaust gas pressure during a combustion cycle and the operational characteristics of an engine to determine when engine operation is abnormal or outside of prescribed tolerances, such as with stationary power sources and vehicle engines.

What is claimed is:

1. A method for detecting an engine cylinder misfire in an internal combustion engine having at least one cylinder, comprising:
    comparing a first load variable (FLV) with a first estimated load variable (FELV) for a first cylinder of the engine;
    determining a first process to utilize, wherein the first process is one of an estimated exhaust manifold pressure process (EEMPP) or a centroid projection process (CPP), and wherein the CPP is based, at least in part, on an estimated exhaust manifold pressure;
    calculating an operating value (OV) in relation to one or more data inputs of engine characteristics and a comparative value (CV) associated with a threshold value in response to the determination of the first process to utilize, wherein the OV and the CV are calculated using either the EEMPP or the CPP based on the comparison of the FLV to the FELV;
    comparing the OV and the CV, and
    detecting a misfire condition for the first cylinder based on the comparison of the OV to the CV.

2. The method of claim 1, further comprising detecting a misfire condition where the OV is greater than the CV.

3. The method of claim 1, wherein if the FLV is greater than the FELV, the utilized first process is the EEMPP, whereby the FLV is one or more of an engine characteristic, engine load, fuel quantity, mass charge flow (MCF), fresh air flow (FAF), flow rate, and the FELV is one or more of an estimated engine characteristic, estimated engine load, estimated fuel quantity, estimated mass charge flow (EMCF), estimated fresh air flow (EFAF), estimated flow rate, associated with the FLV.

4. The method of claim 3, wherein if the FLV is less than the FLEV, the utilized first process is the CPP.

5. The method of claim 4, wherein the one or more data inputs include at least one of: exhaust manifold pressure (EMP), engine speed, fuel quantity, mass air flow (MAF), Exhaust Gas Recirculation (EGR) pressure, ambient pressure, turbine speed and turbine position.

6. The method of claim 5, further comprising the step of repeating the method for one or more additional cylinders of the engine, wherein the engine is one of an internal combustion engine, a diesel engine, a hybrid engine system, and a battery-driven engine.

7. The method of claim 5, wherein the EEMPP further comprises: a) estimating an EMP for the first cylinder (ESTEMP), b) determining a residue threshold in relation to one or more data inputs, and c) calculating a residue as a difference between a measured EMP and the ESTEMP.

8. The method of claim 7, wherein the one or more data inputs is turbine actuator or turbocharger position.

9. The method of claim 7, wherein the residue threshold is the CV and the residue is the OV.

10. The method of claim 9, wherein the misfire condition is determined as being present if the residue is greater than the residue threshold.

11. The method of claim 10, wherein a misfire condition is determined as a detected misfire when the residue is greater than the residue threshold.

12. The method of claim 9, wherein the misfire condition is determined as being not present if the residue is not greater than the residue threshold.

13. The method of claim 9, wherein a misfire condition is determined as detected when the OV is greater than the CV.

14. The method of claim 7, wherein the EEMPP further includes estimating the EMP (ESTEMP) using one of an auto-regressive based, physics-based, or exponential moving average.

15. The method of claim 7, wherein the CPP further comprises: a) computing centroid coordinates associated with the measured EMP, and b) projecting one or more associated centroid coordinates onto a line of separation.

16. The method of claim 15, wherein projecting the one or more associated centroid coordinates onto a line of separation further includes analyzing using one or more pattern classification techniques comprising at least one of linear discriminate analysis techniques or support vector machines.

17. The method of claim 15, wherein the OV is a value of the one or more associated centroid coordinates projected and the CV is less than one.

18. The method of claim 17, wherein the CV is equal to zero.

19. The method of claim 17, wherein if the OV is greater than the CV, a misfire condition of no misfire is determined.

20. The method of claim 17, wherein if the value of the one or more associated centroid coordinates projected is greater than or equal to zero, then a misfire condition is determined as not being present.

21. The method of claim 17, wherein if the residue is greater than the residue threshold, then a misfire condition is determined as being present.

22. The method of claim 17, further comprising the step of repeating the method for a second cylinder of the engine.

23. The method of claim 7, wherein the measured EMP corresponds to an EMP signal.

24. The method of claim 1, wherein the CPP comprises determining one or more centroid coordinates and magnitude of energy corresponding to an EMP signal.

25. A system for identifying a misfire condition of an engine cylinder in an internal combustion engine, comprising:
at least one pressure sensor operatively coupled to the engine to detect an exhaust manifold pressure (EMP);
at least one data sensor operatively coupled to the engine to detect one or more characteristics of the engine; and
a control system for the engine having an exhaust gas output, wherein the control system includes a plurality of actuation controllers being in communication with the at least one pressure sensor and the at least one data sensor;
a data processor of the control system, the data processor structured to:
receive data sensed by the at least one pressure sensor and the at least one data sensor;
determine a first process to utilize, wherein the first process is one of an estimated exhaust manifold pressure process (EEMPP) or a centroid projection process (CPP), and wherein the CPP is based, at least in part, on an estimated exhaust manifold pressure;
utilize the first process to calculate an operating value (OV) based on the received data and a comparative value (CV) associated with a threshold value, wherein the first process is one of an estimated exhaust manifold pressure process (EEMPP) or a centroid projection process (CPP);
compare the OV and the CV; and
detect a misfire condition for the cylinder based on the comparison of the OV to the CV.

26. The system of claim 25, wherein the engine further comprises an exhaust gas recirculation (EGR) arrangement.

27. The system of claim 25, wherein the received data sensed is one or more of an engine characteristic, engine load, fuel quantity, mass charge flow (MCF), fresh air flow (FAF), flow rate, and the estimated associated data is one or more of an estimated engine characteristic, estimated engine load, estimated fuel quantity, estimated mass charge flow (EMCF), estimated fresh air flow (EFAF), estimated flow rate, associated with the received data sensed.

28. The system of claim 27, wherein if the received data sensed is less than an estimated associated data, the utilized first process is the EEMPP, and wherein if the received data sensed is not less than the estimated associated data, the utilized first process is the CPP.

29. The system of claim 28, wherein the EEMPP further comprises: a) estimating an EMP for the first cylinder (ESTEMP), b) determining a residue threshold in relation to one or more data inputs, and c) calculating a residue as a difference between the EMP and the ESTEMP; and, wherein the CPP further comprises: a) computing centroid coordinates associated with the EMP, and b) projecting one or more of the associated centroid coordinates onto a line of separation.

30. The system of claim 29, wherein for the EEMPP, the one or more data inputs is turbocharger position.

31. The system of claim 29, wherein for the EEMPP, the residue threshold is the CV and the residue is the OV; and for the CPP, the CV is a value of the one or more projected centroid coordinates and the CV is less than one.

32. The system of claim 27, wherein the one or more data inputs include at least one of: EMP, engine speed, mass air flow (MAF), Exhaust Gas Recirculation (EGR) pressure, ambient pressure, turbine speed and turbine position.

33. The system of claim 32, wherein if the value of one or more centroid coordinates is greater than or equal to zero, then a misfire condition is determined as not being present.

34. The system of claim 32, wherein if the residue is greater than the residue threshold, then a misfire condition is determined as being present.

35. A computer program product stored on a non-transitory computer usable medium for determining a misfire condition of an internal combustion engine having one or more cylinders, comprising, a computer readable program for causing a computer to control an execution of an Application within a memory control device in operable communications with an engine; the computer readable program when executed by a computer for:
determining one or more data input conditions of engine characteristics of the engine;
comparing a first load variable (FLV) to a first estimated load variable (FELV) for a first cylinder of the engine;
determining a first process to utilize based on the comparison of the FLV to the FELV, wherein the first process is one of an estimated exhaust manifold pressure process (EEMPP) or a centroid projection process (CPP), wherein the CPP is based, at least in part, on an estimated exhaust manifold pressure;
using the determined first process to calculate an operating value (OV) based on the one or more data inputs of engine characteristics, and a comparative value (CV) associated with a threshold value;
comparing the OV and the CV, and,
detecting a misfire condition for the first cylinder based on the comparison of the OV to the CV.

36. The computer program product of claim 35, wherein the engine includes one or more of an EGR, direct injection and spark retarding event.

37. The computer program product of claim 35, wherein the one or more data inputs include at least one of: exhaust manifold pressure (EMP), engine speed, mass air flow (MAF), Exhaust Gas Recirculation (EGR) pressure, ambient pressure, turbine speed and turbine position.

38. The computer program product of claim 35, wherein if the FLV is less than the FELV, the utilized first process is the EEMPP, and wherein if the FLV is not less than the FELV, the utilized first process is the CPP, whereby the FLV is one or more of an engine characteristic, engine load, fuel quantity, mass charge flow (MCF), fresh air flow (FAF), flow rate, and the FELV is one or more of an estimated engine characteristic, estimated engine load, estimated fuel quantity, estimated mass charge flow (EMCF), estimated fresh air flow (EFAF), estimated flow rate, associated with the FLV.

39. The computer program product of claim 38, wherein the EEMPP further comprises: a) estimating an EMP for the first cylinder (ESTEMP), b) determining a residue threshold in relation to one or more data inputs, and c) calculating a residue as a difference between the EMP and the ESTEMP; and, wherein the CPP further comprises: a) computing centroid coordinates associated with the EMP, and b) projecting one or more associated centroid coordinates onto a line of separation.

40. The computer program product of claim 39, wherein for the EEMPP, the residue threshold is the CV and the residue is the OV; and for the CPP, the CV is a value of the one or more associated centroid coordinates projected and the CV is less than one.

41. The computer program product of claim 40, wherein if the value of the one or more associated centroid coordinates projected is greater than or equal to zero, then a misfire condition is determined as not being present.

42. The computer program product of claim 41, wherein if the residue is greater than the residue threshold, then a misfire condition is determined as being present.

43. The computer program product of claim 35, configured for use in a vehicle having the engine being one or more of a diesel engine, a natural gas engine, a hybrid engine, a battery-powered engine, or configured for use as a diagnostic tool suitable for the engine.

44. The computer program product of claim 35, further comprising a slow monitor filter using a mean value model or a frequency based model.

45. A diesel engine configured to detect an engine cylinder misfire, having logic for:
comparing a first load variable (FLV) with a first estimated load variable (FELV) for one or more cylinders of the engine;
determining a first process to utilize that is one of an estimated exhaust manifold pressure process (EEMPP) or a centroid projection process (CPP), wherein the CPP is based, at least in part, on an estimated exhaust manifold pressure;
using the first process, calculating an operating value (OV) based on one or more data inputs of engine characteristics and a comparative value (CV) associated with a threshold value in response to the determination of the first process to utilize;
comparing the OV and the CV; and
detecting a misfire condition for the one or more cylinders of the diesel engine based on the comparison of the OV to the CV.

46. The engine of claim 45, wherein if the FLV is less than the FELV, the utilized first process is the EEMPP, and wherein if the FLV is not less than the FELV, the logic utilized first process is the CPP, whereby the FLV is one or more of an engine characteristic, engine load, fuel quantity, mass charge flow (MCF), fresh air flow (FAF), flow rate, and the FELV is one or more of an estimated engine characteristic, estimated engine load, estimated fuel quantity, estimated mass charge flow (EMCF), estimated fresh air flow (EFAF), estimated flow rate, associated with the FLV condition of no misfire is determined.

47. The engine of claim 46, wherein if the OV is greater than the CV, a misfire condition of no misfire is determined.

\* \* \* \* \*